(12) United States Patent
Wang (10) Patent No.: US 6,785,384 B2
(45) Date of Patent: Aug. 31, 2004

(54) TWO-STEP ALGORITHM FOR TRAINING AN ECHO CANCELLATION FILTER

(75) Inventor: Baoli Wang, Old Bridge, NJ (US)

(73) Assignee: Agere Systems Inc., Allentown, PA (US)

( * ) Notice: Subject to any disclaimer, the term of this patent is extended or adjusted under 35 U.S.C. 154(b) by 681 days.

(21) Appl. No.: 09/729,005

(22) Filed: Dec. 4, 2000

(65) Prior Publication Data

US 2002/0067824 A1 Jun. 6, 2002

(51) Int. Cl.[7] .......................... H04M 1/00; H04M 9/00; H04M 9/08
(52) U.S. Cl. .............................. 379/406.1; 379/406.01; 379/406.02; 370/286
(58) Field of Search ....................... 379/406.01–406.16; 375/285, 296; 370/286, 290

(56) References Cited

U.S. PATENT DOCUMENTS 6,480,532 B1 * 11/2002 Vareljian .................... 375/222

* cited by examiner

Primary Examiner—Curtis Kuntz
Assistant Examiner—Alexander Jamal (57) ABSTRACT

A two-step training method for the estimation filter in the echo cancellation (EC) path of the analog front-end (AFE) circuit for a modem, such as an asymmetric digital subscriber line (ADSL) modem. During the first step, the transmit (TX) path is turned off and a digital TX signal (e.g., a pseudo white gaussian noise signal) is applied to the EC path essentially bypassing the EC estimation filter. During the second step, the EC path is turned off and a digital TX signal (e.g., the same pseudo white gaussian noise signal) is applied to the TX path. Coefficients for the EC estimation filter are then generated based on the digital RX signals recorded during the two training steps. In particular, the recorded digital RX signals are transformed to the frequency domain, where one is divided into the other. The resulting digital signal is then transformed back to the time domain, where it is used to generate the coefficients for the EC estimation filter. For Digital Multi-Tone (DMT) applications, the two-step training method of the present invention should be able to be implemented using at most four DMT symbols.

23 Claims, 5 Drawing Sheets

TWO-STEP ALGORITHM FOR TRAINING AN ECHO CANCELLATION FILTER

CROSS-REFERENCE TO RELATED APPLICATIONS

The subject matter of this application is related to the subject matter of U.S. patent application Ser. No. 09/574,935, filed on May 19, 2000 as Attorney Docket No. Lin 2, the teachings of which are incorporated herein by reference.

BACKGROUND OF THE INVENTION

1. Field of the Invention

The present invention relates to telecommunications circuitry, and, in particular, to echo cancellation filters for interface units that interconnect analog and digital components, such as analog front-end circuits for modems.

2. Description of the Related Art

Figure 1:
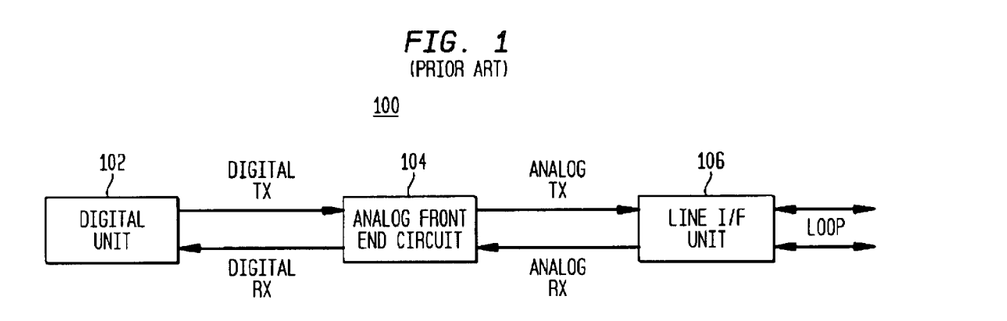
FIG. 1 shows a simplified block diagram of a conventional asymmetric digital subscriber line (ADSL) modem.

FIG. 1 shows a simplified block diagram of a conventional asymmetric digital subscriber line (ADSL) modem 100 that converts an existing twisted-pair telephone loop into an access path for multimedia and high-speed data communications in addition to analog voice signals. As shown in FIG. 1, ADSL modem 100 comprises a digital unit 102 (e.g., a digital signal processor (DSP)) configured to an analog front-end (AFE) circuit 104, which is in turn configured to a line interface unit 106. Digital unit 102 provides a digital transmit (TX) signal to AFE circuit 104, which converts the digital TX signal into an analog TX signal. AFE circuit 104 provides the analog TX signal to the line interface unit 106, which transmits the analog TX signal over the loop, while providing high-voltage, high-current electrical isolation between the loop and the terminal side of ADSL modem 100. At the same time, line interface unit 106 receives an analog signal from the loop and provides an analog receive (RX) signal to AFE circuit 104, which converts the analog RX signal into a digital RX signal, which is then presented to digital unit 102.

Figure 2:
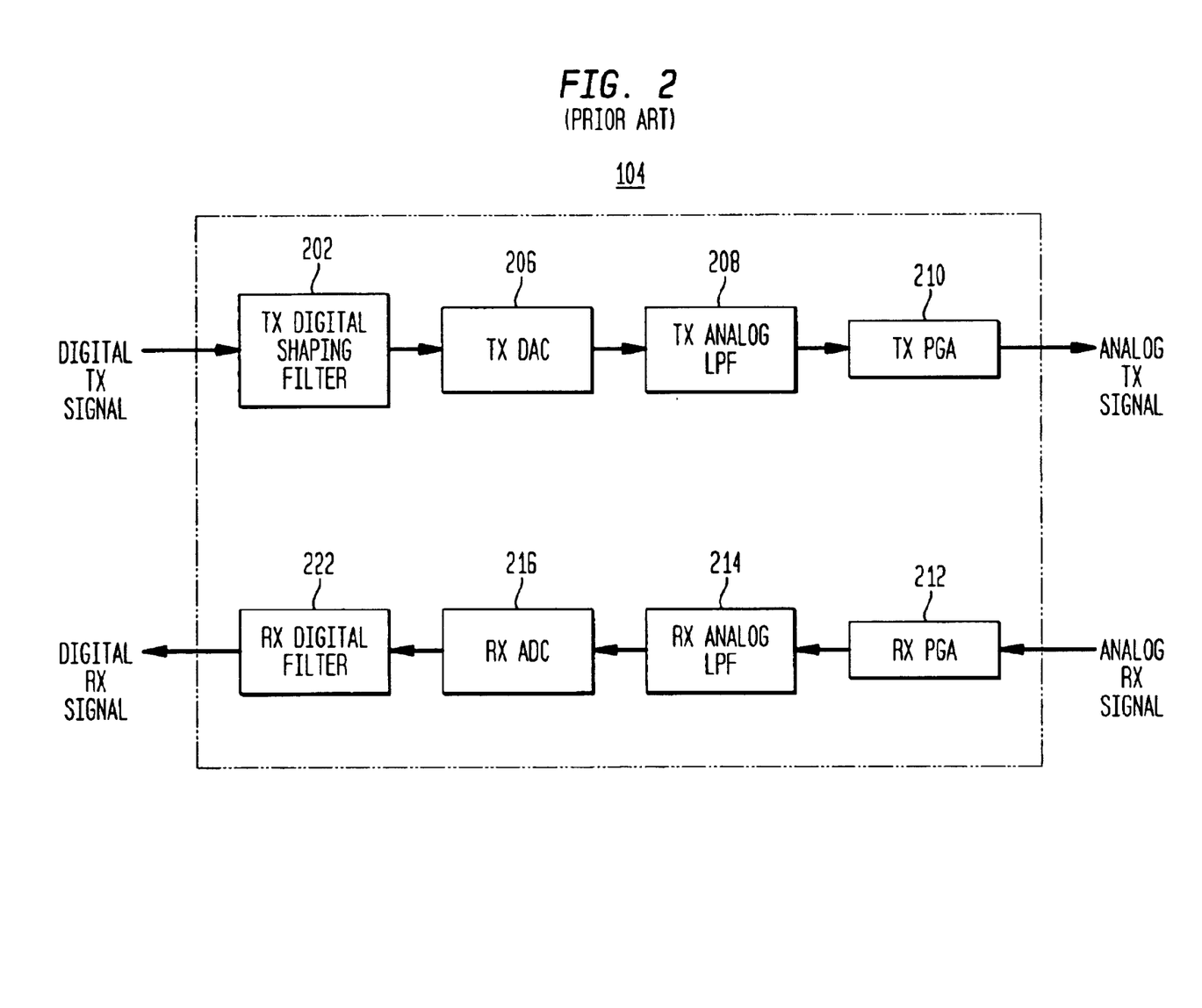
FIG. 2 shows a block diagram of the analog front-end (AFE) circuit of FIG. 1.

FIG. 2 shows a block diagram of AFE circuit 104 of FIG. 1. As shown in FIG. 2, AFE circuit 104 has two parallel processing paths: a transmit path for the digital TX signal received from digital unit 102 and a receive path for the analog RX signal received from line interface unit 106. The transmit path comprises:

TX digital shaping filter 202, which digitally shapes the digital TX signal according to a specified shaping function;

TX digital-to-analog converter (DAC) 206, which converts the digital TX signal from shaping filter 202 into an analog TX signal;

TX analog low-pass filter (LPF) 208, which filters out high-frequency components from the analog TX signal from DAC 206; and TX programmable gain amplifier (PGA) 210, which amplifies the analog TX signal from LPF 208 to generate the analog TX signal that is presented to line interface unit 106.

Analogously, the receive path comprises:

RX PGA 212, which amplifies the analog RX signal received from line interface unit 106;

RX analog LPF 214, which filters out high-frequency components from the analog RX signal from PGA 212; and RX analog-to-digital converter (ADC) 216, which converts the analog RX signal from LPF 214 into a digital RX signal; and RX digital filter 222, which digitally filters the digital RX signal from ADC 216 to generate the digital RX signal that is presented to digital unit 102.

For an xDSL modem, such as ADSL modem 100 of FIG. 1, the TX and RX signals are present on the telephone loop simultaneously with the transmitting and receiving operations being conducted at the same time. The standard technique for separating the signals for the TX and RX paths is based on impedance matching. If the terminating impedance of the line interface unit were exactly equal to the equivalent loop impedance, then the transmit and receive signals would be processed completely independently of one another by the TX and RX paths, respectively. However, since the equivalent loop impedance can vary significantly from one loop to another, no matter how the terminal impedance is designed in the line interface unit, a perfect match will not be achieved for all applications. As a result, there may be significant leakage of the transmit signal into the receive path, also known as echo, which can adversely affect the quality of the receive signal.

One way to address the problem of echo in the RX signal is to implement adaptive echo cancellation (EC) in the digital domain (e.g., implemented within digital unit 102). In that case, AFE circuit 104 does not have to get involved in the EC process. However, in applications with very long loops (e.g., about 10% of all loops), the ADC in the RX path of AFE circuit 104 cannot provide sufficient dynamic range to handle both a strong echo and a weak signal to allow the echo to be sufficiently canceled in the digital domain (i.e., after digitization). In that case, echo cancellation in the analog domain is needed to achieve better performance. With analog-domain EC, the echo is canceled before the ADC in the RX path. As a result, the RX ADC's dynamic range is no longer a performance-limiting factor.

SUMMARY OF THE INVENTION

The present invention is directed to a scheme for training circuitry that performs echo cancellation (EC) in the analog domain, for example, for the AFE circuit of an ADSL modem. The present invention is based on AFE circuitry having an echo cancellation (EC) path in addition to the transmit (TX) and receive (RX) paths, where the EC path comprises an estimation filter that estimates, from the TX signal, the echo that will appear in the RX signal. According to certain embodiments of the present invention, the coefficients for the estimation filter are determined as a result of a two-step training algorithm. In the first step, pseudo white gaussian noise is applied to the EC path with the TX path turned off. In the second step, the same pseudo white gaussian noise is applied to the TX path with the EC path turned off. The different RX signals recorded during the two steps are then mathematically manipulated to determine the coefficients for the estimation filter in the EC path. After training is complete, the coefficients for the estimation filter are preferably held fixed during processing of real transmit and receive signals.

In one embodiment, the present invention is, in a circuit comprising (1) a transmit (TX) path configured to convert a digital TX signal into an analog TX signal; (2) a receive (RX) path configured to convert an analog RX signal into a digital RX signal; and (3) an echo cancellation (EC) path configured to generate an analog EC signal, based on the digital TX signal, to be subtracted from the analog RX signal prior to digitization, a method for training an EC estimation filter in the EC path, comprising the steps of (a) generating a first digital RX signal by applying a first digital TX signal to the circuit with the TX path turned off; (b) generating a second digital RX signal by applying a second digital TX signal to the circuit with the EC path turned off; and (c) generating coefficients for the EC estimation filter based on the first and second digital RX signals.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 3:
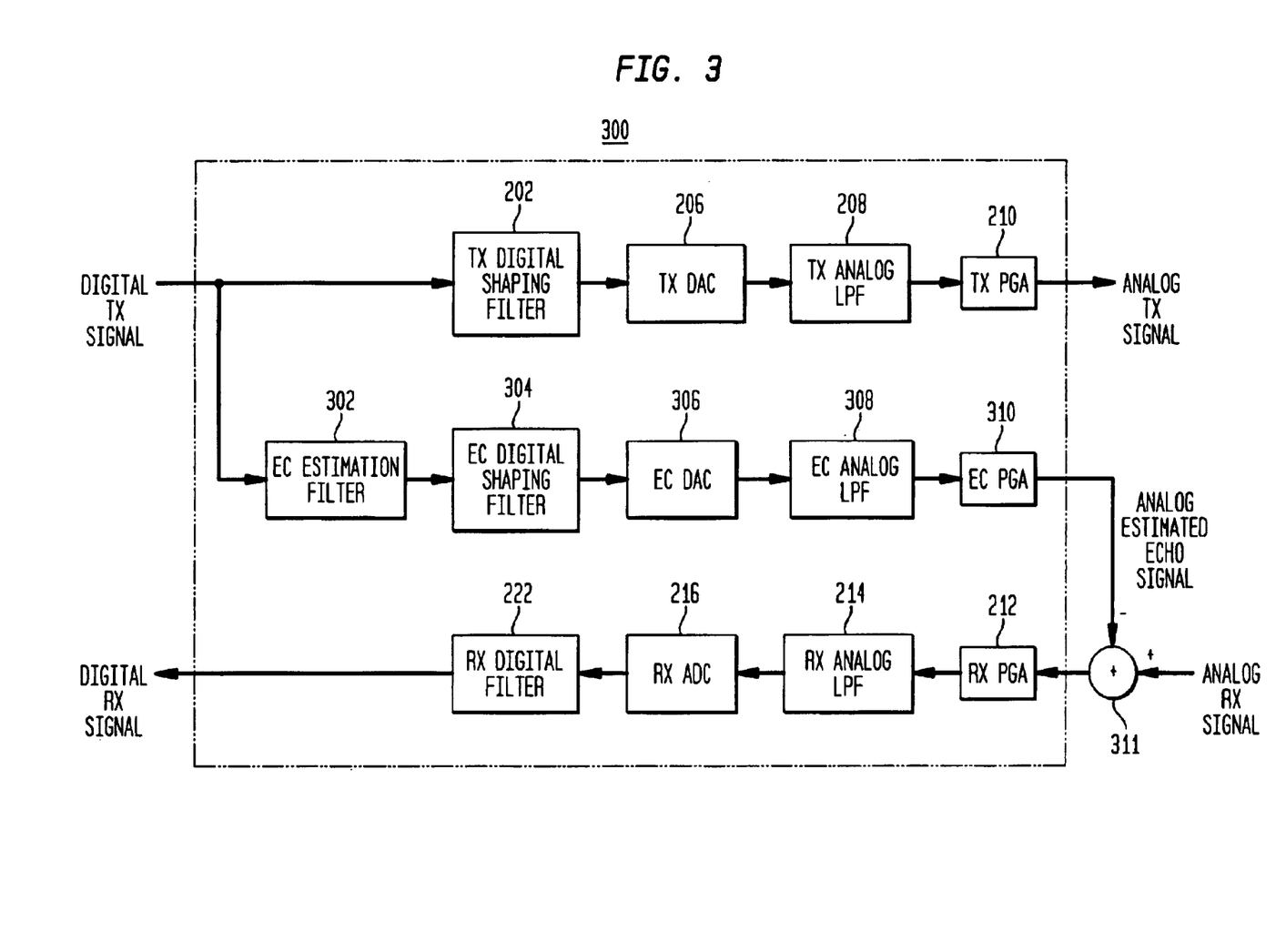
FIG. 3 shows a block diagram of an AFE circuit, according to one embodiment of the present invention.

FIG. 3 shows a block diagram of an AFE circuit 300, according to one embodiment of the present invention. AFE circuit 300 can be used in place of AFE circuit 104 of FIGS. 1–2 for ADSL modem applications.

As shown in FIG. 3, in addition to the conventional components in the transmit (TX) and receive (RX) paths as in AFE circuit 104 of FIG. 2, AFE circuit 300 also has an echo cancellation (EC) path, which uses a copy of the digital TX signal received, for example, from digital unit 102 of FIG. 1 to generate an analog estimated echo signal that is to be subtracted from the analog RX signal received, for example, from line interface unit 106 of FIG. 1 (as indicated in FIG. 3 by summation node 311). In one possible embodiment, summation node 311 is implemented as part of a hybrid circuit in the line interface unit of the ADSL modem, although other configurations are possible, including those where summation node 311 is implemented within AFE circuit 300.

As indicated in FIG. 3, the EC path comprises:

EC estimation filter 302, which generates a digital EC signal from the digital TX signal received by AFE circuit 300 from the digital unit;

EC digital shaping filter 304, which digitally shapes the digital EC signal according to a specified shaping function;

EC DAC 306, which converts the digital EC signal from shaping filter 304 into an analog EC signal;

EC analog LPF 308, which filters out high-frequency components from the analog EC signal from DAC 306; and EC PGA 310, which amplifies the analog EC signal from LPF 308 to generate the analog estimated echo signal that is subtracted from the analog RX signal at summation node 311.

In a preferred implementation, the operating characteristics of the combination of EC digital shaping filter 304, EC DAC 306, EC analog LPF 308, and EC PGA 310 are equivalent to the operating characteristics of the combination of TX digital shaping filter 202, TX DAC 206, TX analog LPF 208, and TX PGA 210.

The echo cancellation technique employed by AFE circuit 300 is designed for a full-rate ADSL modem. This EC technique is designed to reduce in-band echo before the AFE circuit (i.e., before digitization) both (1) to prevent the input peak-to-peak voltage to the AFE circuit from becoming too high and (2) to prevent the ADC in the RX path of AFE circuit 300 from being jammed (i.e., saturated) by a strong echo signal. Any remaining echo can be removed by an echo cancellation module that is implemented purely in the digital domain (e.g., within digital unit 102 of FIG. 1).

For a full-rate ADSL-RT (Remote Terminal) modem, the sampling frequency for the transmit path is 552 KHz, while the sampling frequency of the receive path is 2208 KHz. With these sampling frequencies, any aliasing from frequency folding will not adversely affect the echo cancellation performance in the desired frequency band and the estimation filter length can be kept within a tolerable range.

Figure 4:
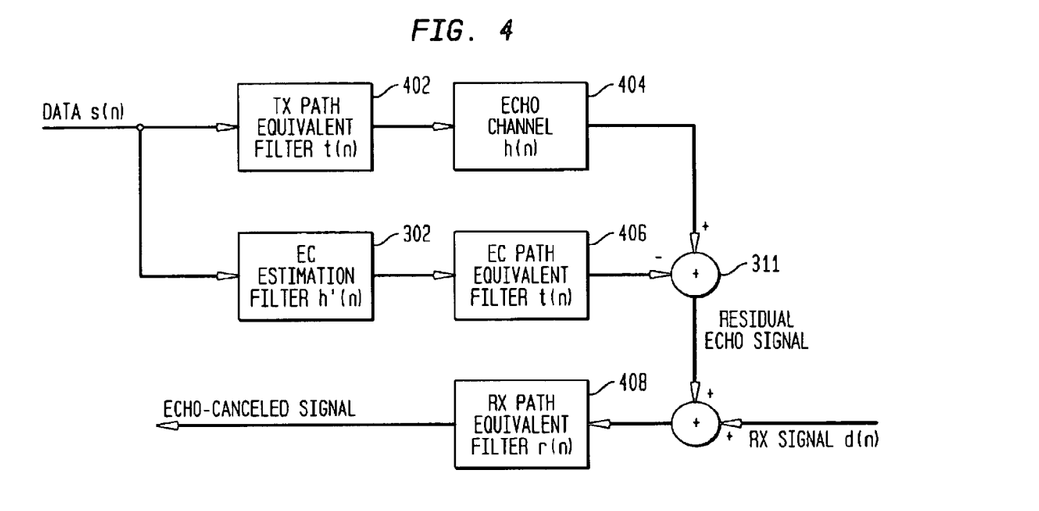
FIG. 4 shows a simplified representation of the AFE circuit of FIG. 3.

FIG. 4 shows a simplified representation of AFE circuit 300 of FIG. 3. In FIG. 4:

TX path equivalent filter t(n) 402 represents the TX path of AFE circuit 300 (i.e., the combination of TX digital shaping filter 202, TX DAC 206, TX analog LPF 208, and TX PGA 210);

Echo channel h(n) 404 represents the echo generated during operation of AFE circuit 300 in an application such as in an ADSL modem;

EC estimation filter h'(n) 302 is the same as EC estimation filter 302 shown in the EC path of FIG. 3 and is represented in FIG. 4 without being combined with any other components;

EC path equivalent filter t(n) 406 represents the rest of the EC path of AFE circuit 300 (i.e., the combination of EC digital shaping filter 304, EC DAC 306, EC analog LPF 308, and EC PGA 310);

RX equivalent filter r(n) 408 represents the RX path of AFE circuit 300 (i.e., the combination of RX PGA 212, RX analog LPF 214, RX ADC 216, and RX digital filter 222); and RX signal d(n) represents the ideal analog RX signal without any added echo signal from the echo channel.

Since the rest of the EC path (i.e., excluding EC estimation filter 302) is preferably designed to be equivalent to the TX path, the same transfer function t(n) is shown in FIG. 4 to represent both TX path equivalent filter 402 and EC path equivalent filter 406.

Ideally, the coefficients of EC estimation filter 302 are set such that the transfer function h'(n) of EC estimation filter 302 is identical to the transfer function h(n) of the echo channel. In that case, the echo cancellation signal generated by the EC path will be equal to the echo signal generated by the echo channel, and the residual echo signal (i.e., after echo compensation at summation node 311) will be zero. In order to determine an appropriate set of coefficients for EC estimation filter 302, AFE circuit 300 is trained prior to processing real TX and RX signals.

Figure 5:
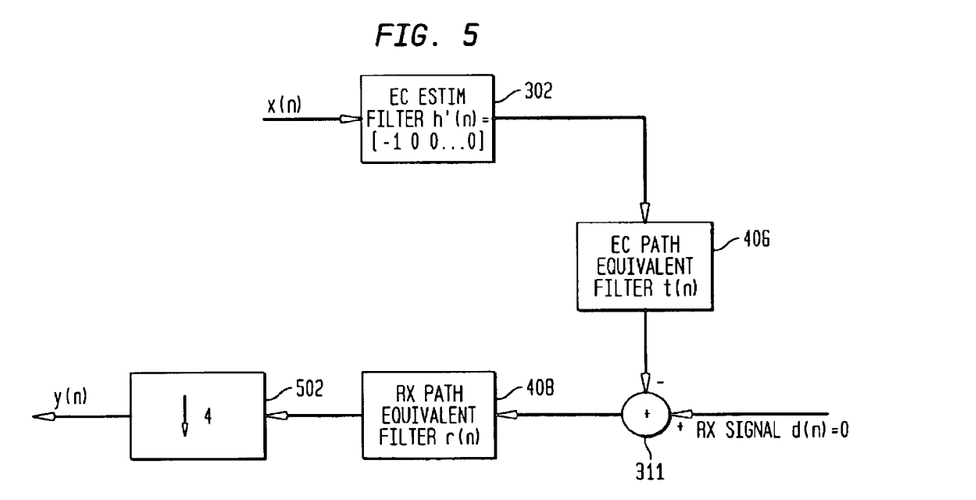
FIGS. 5 and 6 are simplified representations of the AFE circuit of FIGS. 3–4 for the first and second training steps, respectively, of a two-step training algorithm, according to one embodiment of the present invention.
Figure 6:
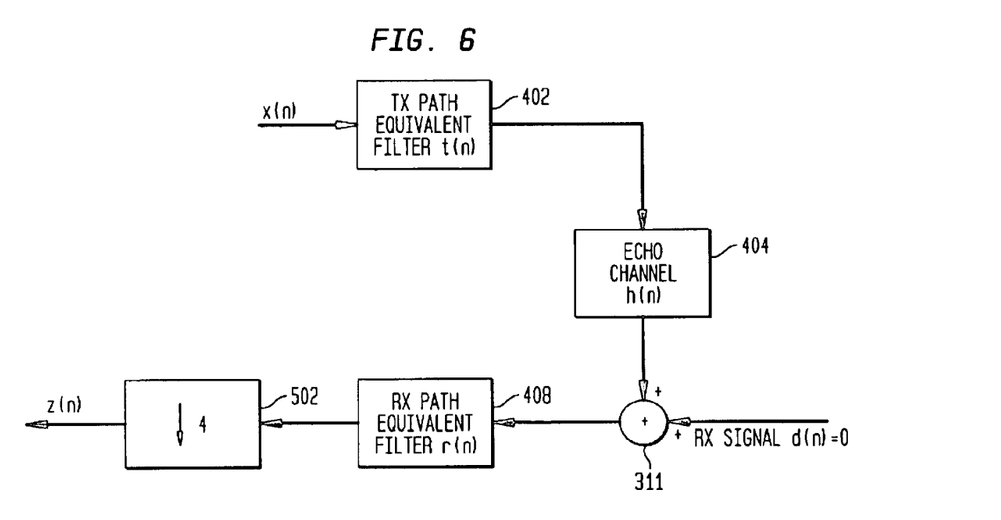

According to one embodiment of the present invention, the coefficients for EC estimation filter 302 are determined during a two-step training algorithm. FIGS. 5 and 6 are simplified representations of the configuration of AFE circuit 300 of FIGS. 3–4 for the first and second training steps, respectively, of the two-step training algorithm.

As indicated in FIG. 5, for the first training step, the TX path is turned off (e.g., by setting all of the coefficients of TX digital shaping filter 202 to zero). During training, the analog RX signal d(n) is zero. In addition, the coefficients of EC estimation filter 302 are set to $\{-1,0,0,\ldots 0\}$. As such, the effect of EC estimation filter 302 is removed and the negative sign on the first filter coefficient compensates for the fact that the signal generated by EC path equivalent filter t(n) 406 is subtracted at summation node 311. The coefficients for filters 202 and 302 for the first training step can be loaded, for example, from the DSP of digital unit 102 into the digital part of AFE circuit 300.

After configuring AFE circuit 300 as shown in FIG. 5, the first training step is performed by transmitting an independent pseudo white gaussian noise signal x(n) through the EC path and decimating the resulting digital RX signal at the output of the RX path by a factor of (2208/552)=4 (at decimator 502) to record a digital signal y(n) having the same rate as the signal x(n). Given the configuration of FIG. 5, the recorded digital signal y(n) may be represented by Equation (1) as follows:

$$y(n)=x(n)*t(n)*r'(n), \qquad (1)$$

where "*" represents the convolution operator and r'(n) is the combined response of RX equivalent filter r(n) 408 and decimator 502.

As indicated in FIG. 6, for the second training step, the EC path is turned off (e.g., by setting all of the coefficients of EC estimation filter 302 to zero). In addition, the normal coefficients are restored to TX shaping filter 202 to turn on the TX path. After configuring AFE circuit 300 as shown in FIG. 6, the second training step is performed by transmitting the same independent pseudo white gaussian noise signal x(n) through the TX path and decimating the resulting digital RX signal at the output of the RX path by a factor of 4 (at decimator 502) to record a digital signal z(n) having the same rate as the signal x(n). Given the configuration of FIG. 6, the recorded digital signal z(n) may be represented by Equation (2) as follows:

$$z(n)=x(n)*t(n)*h(n)*r'(n). \qquad (2)$$

From DSP theory, it is known that, under certain conditions, convolution in the time domain is equivalent to multiplication in the frequency domain. As such, Equations (1) and (2) can be represented in the frequency domain by Equations (3) and (4) as follows:

$$Y(n)=X(n)T(n)R'(n) \qquad (3)$$

and $$Z(n)=X(n)T(n)H(n)R'(n), \qquad (4)$$

where:
Y(n) is the Fourier transform of y(n),
X(n) is the Fourier transform of x(n),
T(n) is the Fourier transform of t(n),
R'(n) is the Fourier transform of r'(n),
Z(n) is the Fourier transform of z(n), and
H(n) is the Fourier transform of h(n).
Dividing Equation (4) by Equation (3) yields Equation (5) as follows:

$$H(n)=Z(n)/Y(n), \qquad (5)$$

where "/" represents a point-to-point complex division operation.

Equation (5) implies that the coefficients for EC estimation filter 302 can be determined by applying a fast Fourier transform (FFT) to the digital signals y(n) and z(n) recorded during the first and second training steps of FIGS. 5 and 6, respectively, to generate digital representations Y(n) and Z(n) of those signals in the frequency domain. The point-to-point complex division operation of Equation (5) can then be performed in the frequency domain to generate H(n). An inverse FFT (IFFT) can then be performed on H(n) to generate h(n), which is the transfer function for the echo channel in the time domain, which is then used to generate the coefficients for EC estimation filter 302.

After training is completed, AFE circuit 300 is configured for real signal processing by fixing the coefficients of EC estimation filter 302 to the coefficient values generated during the two-step training algorithm.

The present invention provides advantages over prior art training techniques. In theory, only two Digital Multi-Tone (DMT) symbols are required to be transmitted during each of the two training steps. Even assuming less than ideal circumstances, at most four DMT symbols would likely be needed for each of the training steps. As such, training can be implemented in a relatively short period of time. Moreover, the present invention relies on FFT and IFFT algorithms, which are inherent in DMT data transmission systems. As such, very little DSP memory is needed to store the training algorithm, thereby minimizing system costs associated with training.

In accordance with the T1.413 Specification (T1.413 Issue 2 of Draft Standard of ADSL, ANSI T1E1.4/98-007R5 (30 Nov. 1998) and the G.992.1 Specification (Draft Recommendation for ADSL Transceivers, ITU-T G.992.1 (July 1999), 512 DMT symbols are allocated for echo cancellation training. With the two-step training algorithm of the present invention, at most eight symbols are used to train the analog-domain echo cancellation circuitry of FIG. 3 (i.e., 2–4 symbols during the first training step and another 2–4 symbols during the second training step). This leaves at least another 500 or so symbols available to train any digital-domain echo cancellation that is implemented within digital unit 102 of the ADSL modem.

The present invention has been described in the context of training AFE circuit 300 using a pseudo white gaussian noise signal as the digital TX signal x(n) for both training steps. It will be understood that repeatedly transmitting one symbol of C-REVERB1 signal defined in the T1.413 and G992.1 Specifications during training will meet signal property requirements and further simplify the EC training. Moreover, since the performance of the second training step does not rely on results from the first training step, it will be understood that the order of implementation of the two training steps can be reversed.

Those skill in the art will understand that the present invention can be implemented in AFE circuits having configurations that are different from the exact configuration shown in FIG. 3 for AFE circuit 300. For example, if the DAC and ADC functions are sigma-delta DAC and ADC functions, then the transmit, echo, and receive paths may be configured with appropriate interpolators and/or decimators that support sigma-delta coding. Other types of DAC and ADC functions may require other interpolators and/or decimators or even no interpolators and/or decimators. In addition, the various digital filters (such as filters 202 and 222) and analog filters (such as filters 208 and 214) can be modified, moved, or even eliminated in certain embodiments, as can amplifiers 210, 212, and/or 310. Furthermore, other embodiments may have additional components not shown in FIG. 3, such as additional filters and the like.

Although the present invention has been described in the context of an AFE circuit for an ADSL-RT (Remote Terminal) modem, those skilled in the art will understand that the present invention can be modified and implemented for ADSL-CO (Central Office) modems and other applications, including other DSL modems, such as symmetric DSL (SDSL), high-speed DSL (HDSL), and very high-speed DSL (VDSL) modems, as well as non-DSL modems or other interface circuits that integrate analog and digital parts of communications systems.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. In a circuit comprising (1) a transmit (TX) path configured to convert a digital TX signal into an analog TX signal; (2) a receive (RX) path configured to convert an analog RX signal into a digital RX signal; and (3) an echo cancellation (EC) path configured to generate an analog EC signal, based on the digital TX signal, to be subtracted from the analog RX signal prior to digitization, a method for training an EC estimation filter in the EC path, comprising the steps of:
    (a) generating a first digital RX signal by applying a first digital TX signal to the circuit with the TX path turned off and with the EC and RX paths turned on;
    (b) generating a second digital RX signal by applying a second digital TX signal to the circuit with the EC path turned off and with the TX and RX paths turned on; and
    (c) generating coefficients for the EC estimation filter based on the first and second digital RX signals.

2. The invention of claim 1, wherein the circuit is an analog front-end (AFE) circuit for an asymmetric digital subscriber line (ADSL) modem.

3. The invention of claim 1, wherein the circuit is an AFE circuit that forms part of an ADSL modem.

4. The invention of claim 1, wherein step (a) further comprises the step of fixing the coefficients of the EC estimation filter to $\{-1, 0, 0, \ldots 0\}$.

5. The invention of claim 1, wherein the first digital TX signal is identical to the second digital TX signal.

6. The invention of claim 5, wherein the first and second digital TX signals are pseudo white gaussian noise signals.

7. The invention of claim 1, wherein step (c) comprises the steps of:
    (1) transforming the first and second digital RX signals to generate first and second digital RX signals in the frequency domain;
    (2) applying a division operation between the second digital RX signal in the frequency domain and the first digital RX signal in the frequency domain to generate a third digital signal in the frequency domain;
    (3) transforming the third digital signal in the frequency domain to generate a third digital signal in the time domain; and
    (4) generating the coefficients for the EC estimation filter from the third digital signal in the time domain.

8. The invention of claim 7, wherein:
    step (c)(1) comprises the step of applying a fast Fourier transform (FFT) to the first and second digital RX signals to generate the first and second digital RX signals in the frequency domain;
    the division operation is a point-to-point complex division operation; and
    step (c)(3) comprises the step of applying an inverse FFT (IFFT) to the third digital signal in the frequency domain to generate the third digital signal in the time domain.

9. The invention of claim 8, wherein:
    the circuit is an AFE circuit for an ADSL modem;
    step (a) further comprises the step of fixing the coefficients of the EC estimation filter to $\{-1, 0, 0, \ldots 0\}$;
    the first digital TX signal is identical to the second digital TX signal; and
    the first and second digital TX signals are pseudo white gaussian noise signals.

10. A machine-readable medium, having encoded thereon program code, wherein, when the program code is executed by a machine, the machine implements a method for training an EC estimation filter in an EC path in a circuit comprising (1) a TX path configured to convert a digital TX signal into an analog TX signal; (2) an RX path configured to convert an analog RX signal into a digital RX signal; and (3) the EC path configured to generate an analog EC signal, based on the digital TX signal, to be subtracted from the analog RX signal prior to digitization, comprising the steps of:
    (a) generating a first digital RX signal by applying a first digital TX signal to the circuit with the TX path turned off and with the EC RX paths turned on;
    (b) generating a second digital RX signal by applying a second digital TX signal to the circuit with the EC path turned off and with the TX and RX paths turned on; and
    (c) generating coefficients for the EC estimation filter based on the first and second digital RX signals.

11. The invention of claim 10, wherein the circuit is an AFE circuit for an ADSL modem.

12. The invention of claim 10, wherein the circuit is an AFE circuit that forms part of an ADSL modem.

13. The invention of claim 10, wherein step (a) further comprises the step of fixing the coefficients of the EC estimation filter to $\{-1, 0, 0, \ldots 0\}$.

14. The invention of claim 10, wherein the first digital TX signal is identical to the second digital TX signal.

15. The invention of claim 14, wherein the first and second digital TX signals are pseudo white gaussian noise signals.

16. The invention of claim 10, wherein step (c) comprises the steps of:

(1) transforming the first and second digital RX signals to generate first and second digital RX signals in the frequency domain;

(2) applying a division operation between the second digital RX signal in the frequency domain and the first digital RX signal in the frequency domain to generate a third digital signal in the frequency domain;

(3) transforming the third digital signal in the frequency domain to generate a third digital signal in the time domain; and (4) generating the coefficients for the EC estimation filter from the third digital signal in the time domain.

17. The invention of claim 16, wherein:

step (c)(1) comprises the step of applying an FFT to the first and second digital RX signals to generate the first and second digital RX signals in the frequency domain;

the division operation is a point-to-point complex division operation; and step (c)(3) comprises the step of applying an IFFT to the third digital signal in the frequency domain to generate the third digital signal in the time domain.

18. The invention of claim 17, wherein:

the circuit is an AFE circuit for an ADSL modem;

step (a) further comprises the step of fixing the coefficients of the EC estimation filter to $\{-1,0,0, \ldots 0\}$;

the first digital TX signal is identical to the second digital TX signal; and the first and second digital TX signals are pseudo white gaussian noise signals.

19. In a circuit comprising (1) a transmit (TX) path configured to convert a digital TX signal into an analog TX signal; (2) a receive (RX) path configured to convert an analog RX signal into a digital RX signal; and (3) an echo cancellation (EC) path configured to generate an analog EC signal, based on the digital TX signal, to be subtracted from the analog RX signal prior to digitization, a method for training an EC estimation filter in the EC path, comprising the steps of:

(a) generating a first digital RX signal by applying a first digital TX signal to the circuit with the TX path turned off;

(b) generating a second digital RX signal by applying a second digital TX signal to the circuit with the EC path turned off; and (c) generating coefficients for the EC estimation filter based on the first and second digital RX signals, wherein step (a) further comprises the step of fixing the coefficients of the EC estimation filter to $\{-1, 0, 0, \ldots 0\}$.

20. In a circuit comprising (1) a transmit (TX) path configured to convert a digital TX signal into an analog TX signal; (2) a receive (RX) path configured to convert an analog RX signal into a digital RX signal; and (3) an echo cancellation (EC) path configured to generate an analog EC signal, based on the digital TX signal, to be subtracted from the analog RX signal prior to digitization, a method for training an EC estimation filter in the EC path, comprising the steps of:

(a) generating a first digital RX signal by applying a first digital TX signal to the circuit with the TX path turned off;

(b) generating a second digital RX signal by applying a second digital TX signal to the circuit with the EC path turned off; and (c) generating coefficients for the EC estimation filter based on the first and second digital RX signals, wherein:

the first digital TX signal is identical to the second digital TX signal; and the first and second digital TX signals are pseudo white gaussian noise signals.

21. In a circuit comprising (1) a transmit (TX) path configured to convert a digital TX signal into an analog TX signal; (2) a receive (RX) path configured to convert an analog RX signal into a digital RX signal; and (3) an echo cancellation (EC) path configured to generate an analog EC signal, based on the digital TX signal, to be subtracted from the analog RX signal prior to digitization, a method for training an EC estimation filter in the EC path, comprising the steps of:

(a) generating a first digital RX signal by applying a first digital TX signal to the circuit with the TX path turned off;

(b) generating a second digital RX signal by applying a second digital TX signal to the circuit with the EC path turned off, and (c) generating coefficients for the EC estimation filter based on the first and second digital RX signals, wherein step (c) comprises the steps of:

(1) transforming the first and second digital RX signals to generate first and second digital RX signals in the frequency domain;

(2) applying a division operation between the second digital RX signal in the frequency domain and the first digital RX signal in the frequency domain to generate a third digital signal in the frequency domain;

(3) transforming the third digital signal in the frequency domain to generate a third digital signal in the time domain; and (4) generating the coefficients for the EC estimation filter from the third digital signal in the time domain.

22. The invention of claim 21, wherein:

step (c)(1) comprises the step of applying a fast Fourier transform (FFT) to the first and second digital RX signals to generate the first and second digital RX signals in the frequency domain;

the division operation is a point-to-point complex division operation; and step (c)(3) comprises the step of applying an inverse FFT (IFFT) to the third digital signal in the frequency domain to generate the third digital signal in the time domain.

23. The invention of claim 22, wherein:

the circuit is an ALFE circuit for an ADSL modem;

step (a) further comprises the step of fixing the coefficients of the EC estimation filter to $\{-1, 0, 0, \ldots 0\}$;

the first digital TX signal is identical to the second digital TX signal; and the first and second digital TX signals are pseudo white gaussian noise signals.

* * * * *